United States Patent
Su

(10) Patent No.: US 8,575,805 B2
(45) Date of Patent: Nov. 5, 2013

(54) ELECTRIC MOTOR ROTOR SELECTIVELY FORMED OF ONE OF TWO DIFFERENT MAGNETIC UNITS

(75) Inventor: Wei-Chung Su, Taichung (TW)

(73) Assignee: Yen Shen Electric Ind. Co., Ltd., Taichung (TW)

( * ) Notice: Subject to any disclaimer, the term of this patent is extended or adjusted under 35 U.S.C. 154(b) by 284 days.

(21) Appl. No.: 13/082,154

(22) Filed: Apr. 7, 2011

(65) Prior Publication Data

US 2012/0181889 A1 Jul. 19, 2012

(30) Foreign Application Priority Data

Jan. 18, 2011 (TW) .............................. 100101813 A

(51) Int. Cl.
 *H02K 21/12* (2006.01)
(52) U.S. Cl.
 USPC .................................................... 310/156.08
(58) Field of Classification Search
 USPC ................ 310/156.08, 156.12, 156.13, 261.1
 See application file for complete search history.

(56) References Cited

U.S. PATENT DOCUMENTS

| 4,973,872 | A  | * | 11/1990 | Dohogne ................. | 310/156.28 |
| 5,828,152 | A  | * | 10/1998 | Takeda et al. ............ | 310/156.19 |
| 6,803,690 | B2 | * | 10/2004 | Bosch ...................... | 310/156.02 |
| 7,394,174 | B2 | * | 7/2008  | Blase et al. ............... | 310/43 |
| 7,679,251 | B2 | * | 3/2010  | Ohkawa et al. .......... | 310/156.12 |
| 2004/0217664 | A1 | * | 11/2004 | Kuwabara et al. ....... | 310/156.21 |
| 2010/0026123 | A1 | * | 2/2010  | Feng et al. ............... | 310/156.08 |

FOREIGN PATENT DOCUMENTS

TW M345421 11/2008

* cited by examiner

*Primary Examiner* — Nguyen N Hanh
(74) *Attorney, Agent, or Firm* — Muncy, Geissler, Olds & Lowe, PLLC

(57) ABSTRACT

An electric motor rotor includes a core member having a plurality of locating grooves spaced around the periphery thereof and outer rotation-stopping portions, and a magnetic unit arranged around the periphery of the core member and defining a plurality of magnetic zones corresponding to the space between each two adjacent locating grooves. The magnetic unit can be a magnetic barrel having inner rotation-stopping portions for abutting against the outer rotation-stopping portions of the core member. Alternatively, the magnetic unit can be made comprising a plurality of magnets to form the multiple magnetic zones and a hoop for attaching to the magnets to secure the magnets to the periphery of the core member. Using the core member with the said two magnetic units can make two different rotors that have the common advantages of quick assembly, accurate alignment of magnetic zones and cost-effectiveness.

7 Claims, 3 Drawing Sheets

ELECTRIC MOTOR ROTOR SELECTIVELY FORMED OF ONE OF TWO DIFFERENT MAGNETIC UNITS

BACKGROUND OF THE INVENTION

1. Field of the Invention

The present invention relates to electric motor rotor technology and more particularly, to an improved design of electric motor rotor in which one core member is selectively used with two different magnetic units to constitute two different modes.

2. Description of the Related Art

Taiwan Utility model M345421 discloses an electric motor rotor, which comprises a cylindrical core member, a plurality of magnets bonded to and spaced around the periphery of the core member to form multiple magnetic zones, and a hoop attached to the magnets to secure the magnets to the core member positively and to prohibit falling of the magnets from the core member during rotation of the rotor in a stator. However, when bonding the magnets to the core member, alignment of the magnets is difficult to achieve. Thus, assembling the rotor takes much time. Further, if the magnets are not accurately bonded to the core member in position, the magnetic zones of the rotor will not be accurately aligned, affecting rotor performance.

To eliminate the aforesaid problem, the cited invention discloses another rotor design, which comprises a cylindrical core member having a plurality of mounting grooves equiangular spaced around the periphery thereof, a plurality of H-shaped locating members respectively affixed to the mounting grooves, and a plurality of magnets respectively mounted in between each two adjacent H-shaped locating members. Thus, the magnets can easily be set in a respective predetermined position without any alignment procedure. Further, the H-shaped locating members provide a function to secure the magnets in position. Therefore, no further hoop means is necessary to secure the magnets in position. Arranging the H-shaped locating members facilitates quick installation of the magnets and accurate positioning of the magnetic zones, however the arrangement of the H-shaped locating members relatively increases the rotor cost. Therefore, an improvement in this regard is necessary.

SUMMARY OF THE INVENTION

The present invention has been accomplished under the circumstances in view. It is the main object of the present invention to provide an electric motor rotor, which facilitates quick assembly and accurate alignment of magnetic zones and saves the cost.

To achieve this and other objects of the present invention, an electric motor rotor comprises a core member and a magnetic unit. The core member is formed of a stack of silicon steel plates, comprising a plurality of locating grooves spaced around the center thereof and curved inwardly from the periphery thereof and at least one outer rotation-stopping portion. The magnetic unit is arranged around the periphery of the core member, comprising a plurality of magnetic zones respectively defined corresponding to the space around the periphery of the core member between each two adjacent locating grooves.

The magnetic unit can be a magnetic barrel having at least one inner rotation-stopping portion. By means of attaching the magnetic barrel to the core member to abut the at least one inner rotation-stopping portion against the at least one outer rotation-stopping portion of the core member, the magnetic zones are accurately positioned in the predetermined positions, facilitating installation. Further, as the electric motor rotor consists of a limited number of component parts, its manufacturing cost is low. Alternatively, the magnetic unit can be made comprising a plurality of magnets for bonding to the periphery of the core member between each two adjacent locating grooves to form the multiple magnetic zones, and a non-magnetic hoop for attaching to the outer side of each of the magnets to enhance the connection tightness between the magnets and the core member. Supplementary positioning strips can be detachably fastened to the locating grooves of the core member to facilitate quick and accurate mounting of the magnets. After bonding of the magnets, the supplementary positioning strips can be removed from the core member for further repeated use, saving the cost.

The aforesaid two modes of rotors have respective advantages to fit different application requirements. Further, both the two rotors use one same design of core member. Thus, one design of core member can be selectively used with two different magnetic units to make two different rotors, saving the core member molding and inventory costs, and therefore the manufacturing costs of the two different rotors can be relatively reduced.

BRIEF DESCRIPTION OF THE DRAWINGS

Other features and advantages of the present invention will be understood by reference to the following specification in conjunction with the accompanying drawings, which like reference signs denote like elements of the structure.

DETAILED DESCRIPTION OF THE INVENTION

Figure 1:
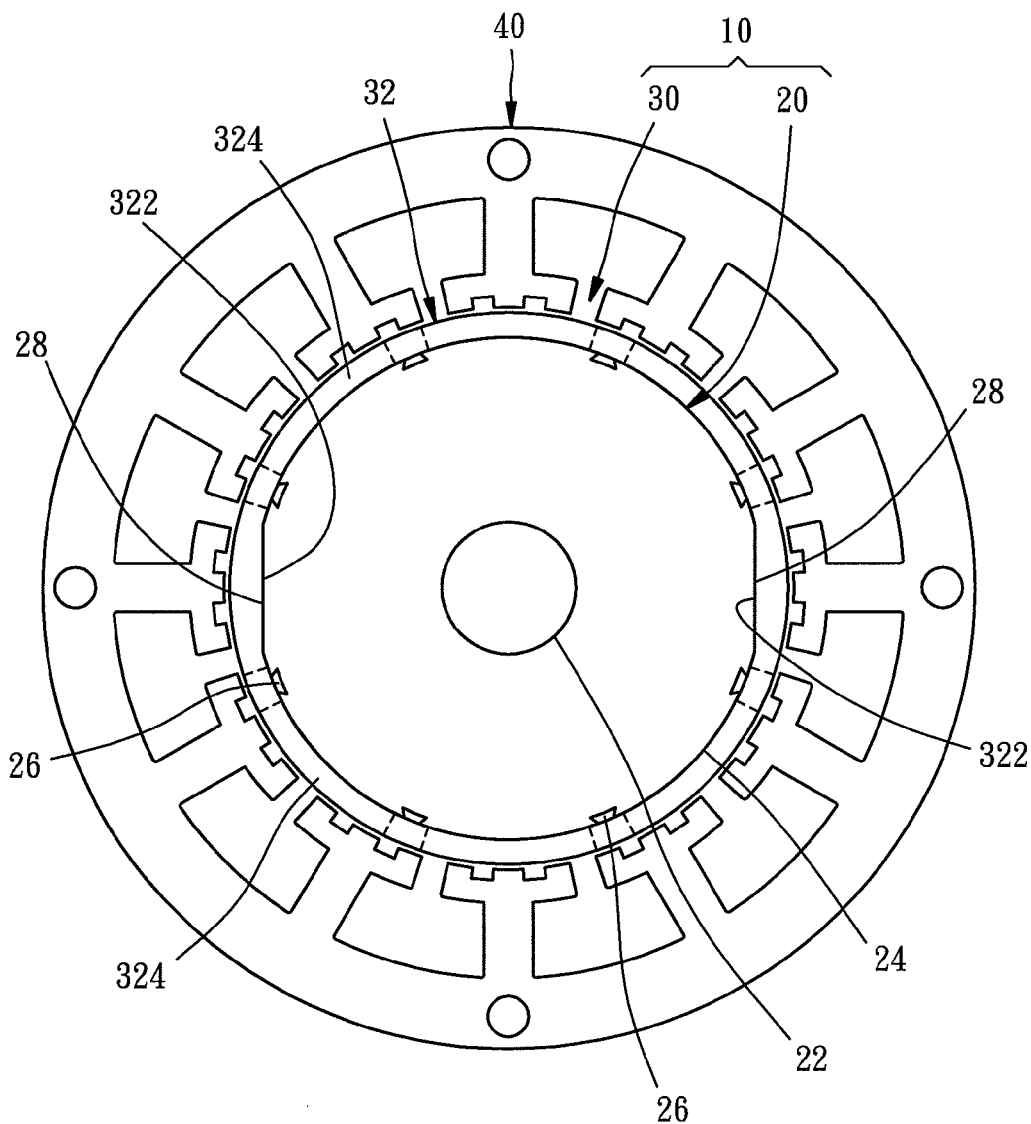
FIG. 1 is a schematic end view illustrating an electric motor rotor installed in a stator in accordance with a first embodiment of the present invention.

Referring to FIG. 1, an electric motor rotor 10 in accordance with a first embodiment of the present invention is shown comprising a core member 20 and a magnetic unit 30 arranged around the core member 20.

The core member 20 is a cylindrical member formed by stacking up a set of silicon steel plates, having an axial hole 22 axially disposed at the center for the mounting of an output shaft (not shown), a plurality of locating grooves 26 curved inwardly from the periphery 24 toward the inside of the core member 20 and at least one planar outer rotation-stopping portion 28. The locating grooves 26 are spaced around the center of the core member 20. According to this embodiment, the core member 20 comprises two opposing planar outer rotation-stopping portion 28. The planar outer stop portions 28 are dovetail-shaped. However, this mode is not a limitation. Each planar outer rotation-stopping portion 28 is located between two adjacent locating grooves 26.

The magnetic unit 30 comprises a magnetic barrel 32 that has a circular shape and at least one planar inner rotation-stopping portion 322 corresponding to the at least one planar outer rotation-stopping portion 28 of the core member 20. According to this embodiment, the magnetic unit 30 comprises two opposing planar inner rotation-stopping portions 322. The magnetic unit 30 further comprises a plurality of magnetic zones 324. The number of the magnetic zones 324 is equal to the number of the locating grooves 26 of the core member 20. The magnetic zones 324 are equiangularly spaced around the center of the magnetic barrel 32. Each inner rotation-stopping portion 322 corresponds to one respective magnetic zone 324. According to this embodiment, the magnetic barrel 32 is a bonded magnet made from a plastic magnetic compound by molding and then magnetized to provide the aforesaid magnetic zones 324. However, this magnetic barrel fabrication method is simply an example but not a limitation.

When assembling the rotor 10, aim the at least one planar inner rotation-stopping portion 322 of the magnetic barrel 32 of the magnetic unit 30 at the at least one planar outer rotation-stopping portion 28 of the core member 20, and then sleeve the magnetic barrel 32 onto the core member 20 to keep the at least one planar inner rotation-stopping portion 322 and the inside wall of the magnetic barrel 32 in contact with the at least one planar outer rotation-stopping portion 28 and the periphery 24 of the core member 20. Thus, the magnetic zones 324 of the magnetic barrel 32 face the periphery 24 of the core member 20 corresponding to the area between each two adjacent locating grooves 26. Therefore, when assembling the rotor 10, it simply needs to aim the at least one planar inner rotation-stopping portion 322 at the at least one planar outer rotation-stopping portion 28 respectively, and the magnetic zones 324 of the magnetic barrel 32 will be automatically positioned in the predetermined position to keep the magnetic zones 324 equally spaced without any further alignment procedure. Further, when the rotor 10 is magnetically induced to rotate in a stator 40, the magnetic barrel 32 is prohibited from rotation relative to the core member 20, and therefore the magnetic barrel 32 will never be forced away and, displacement of the magnetic zones 324 will never occur. In other words, the rotor 10 can be rapidly assembled to keep the magnetic zones 324 in position accurately. As the rotor 10 uses a less number of component parts, its manufacturing cost is relatively low.

According to the aforesaid first embodiment of the present invention, the magnetic barrel 32 of the rotor 10 is a bonded magnet made from a plastic magnetic compound by molding, having the disadvantage of weak magnetic power. For making a motor having high magnetic power, a rotor 50 (see FIG. 2 and FIG. 3) in accordance with a second embodiment of the present invention can be used.

The rotor 50 comprises a core member 20 and a magnetic unit 60 arranged around the core member 20. The magnetic unit 60 comprises a plurality of magnets 62 and a hoop 64. The magnets 62 are bonded to the periphery 24 of the core member 20 and respectively disposed between each two adjacent locating grooves 26 to provide one respective magnetic zone. The hoop 64 is attached to the outer side of each of the magnets 62 to enhance connection tightness between the magnets 62 and the core member 20. According to this embodiment, the magnets 62 are sintered magnets; the hoop 64 is made of stainless steel or any other non-magnetic material.

Figure 2:
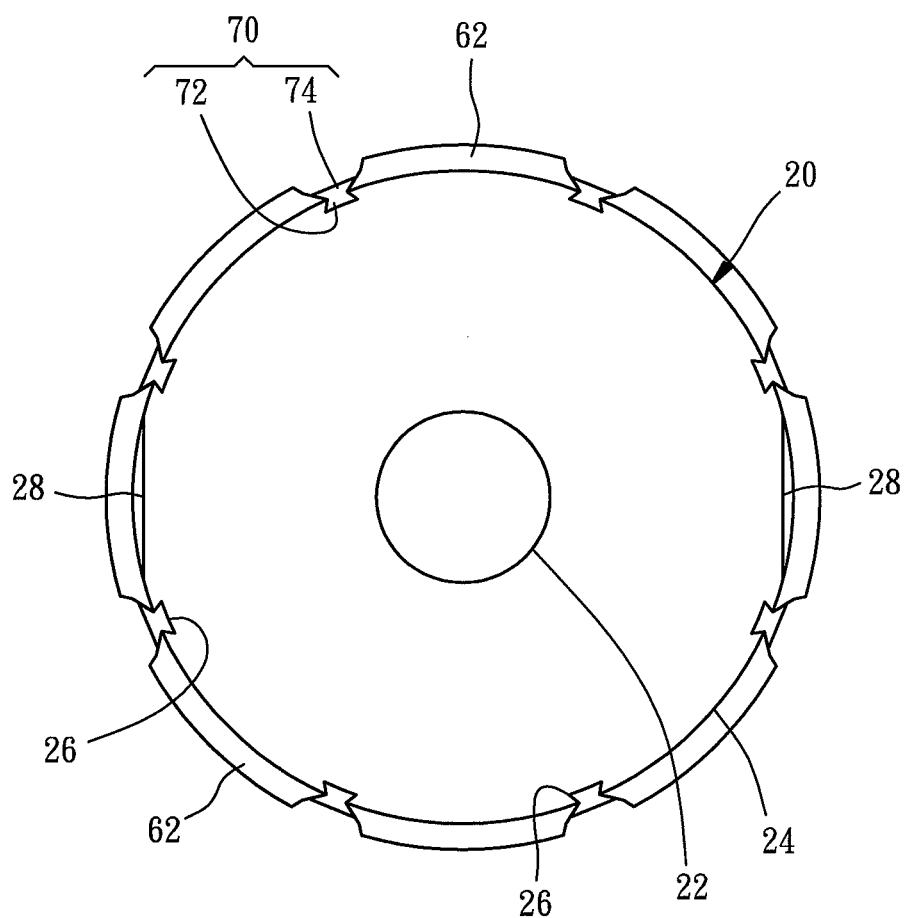
FIG. 2 is a schematic end view illustrating an assembly status of an electric motor rotor in accordance with a second embodiment of the present invention.
Figure 3:
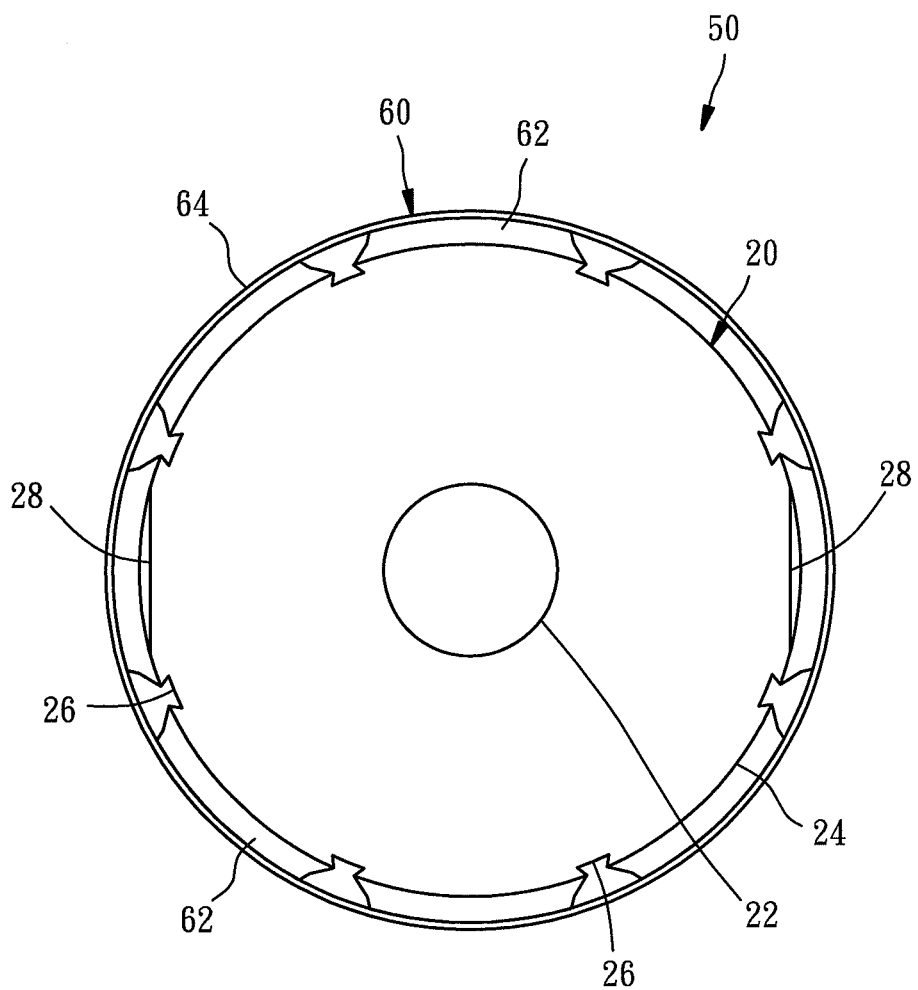
FIG. 3 is a schematic end view of the electric motor rotor in accordance with the second embodiment of the present invention.

When assembling the rotor 50, aim the magnets 62 at the locating grooves 26 and then bond the magnets 62 to the periphery 24 of the core member 20. To facilitate quick and accurate installation of the magnets 62, as shown in FIG. 2, a supplementary positioning strip 70 can be respectively temporarily set in each locating groove 26 before bonding the magnets 62. Each positioning strip 70 comprises a mounting portion 72 fitted into one respective locating groove 26 in a complementary manner, and a positioning portion 74 protruding over the periphery 24 of the core member 20. According to this embodiment, the positioning portion 74 of each positioning strip 70 is dovetail-shaped, having a width gradually increasing in direction away from the mounting portion 72. The supplementary positioning strips 70 define multiple spaces around the periphery 24 of the core member 20 for accommodating the magnets 62. However, the shape of the supplementary positioning strips 70 is not limited to the design of this embodiment.

After the supplementary positioning strips 70 have been respectively fastened to the locating grooves 26, the magnets 62 can be conveniently and quickly inserted in between each two adjacent supplementary positioning strips 70 and temporarily positioned in the respective predetermined positions, facilitating performance of a further bonding step. Thus, the rotor 50 can accurately and rapidly be assembled. After the rotor 50 is assembled, the supplementary positioning strips 70 can be removed from the locating grooves 26 for repeated use, saving the cost.

The aforesaid two rotors 10;50 have the advantages of quick assembly, accurate alignment of magnetic zones and cost-effectiveness. The rotor 10 according to the first embodiment of the present invention can be quickly assembled. The rotor 50 according to the second embodiment of the present invention provides a relatively higher magnetic force. Both the two rotors 10;50 have respective advantages to fit different application requirements. Further, both the two rotors 10;50 use one same design of core member 20. Thus, one design of core member 20 can be selectively used with two different magnetic units 30;60 to make two different rotors 10;50, saving the core member molding and inventory costs, and therefore the manufacturing costs of the two different rotors 10;50 can be relatively reduced.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An electric motor rotor, comprising:
   a core member formed of a stack of silicon steel plates, said core member comprising a plurality of locating grooves spaced around the center thereof and curved inwardly from the periphery thereof and at least one outer rotation-stopping portion; and
   a magnetic unit arranged around the periphery of said core member, said magnetic unit comprising a plurality of magnetic zones respectively defined corresponding to the space around the periphery of said core member between each two adjacent locating grooves, and a magnetic barrel defining said magnetic zones, said magnetic barrel comprising at least one inner rotation-stopping portion abutted against said at least one outer rotation-stopping portion of said core member.

2. The electric motor rotor as claimed in claim 1, wherein said magnetic barrel is a bonded magnet.

3. The electric motor rotor as claimed in claim 1, wherein said magnetic barrel comprises two opposing outer rotation-stopping portions; said core member comprises two opposing inner rotation-stopping portions respectively abutted against said outer rotation-stopping portions of said magnetic barrel.

4. An electric motor rotor, comprising:
   a core member formed of a stack of silicon steel plates, said core member comprising a plurality of locating grooves spaced around the center thereof and curved inwardly from the periphery thereof and at least one outer rotation-stopping portion; and a magnetic unit arranged around the periphery of said core member, said magnetic unit comprising a plurality of magnetic zones respectively defined corresponding to the space around the periphery of said core member between each two adjacent locating grooves, a plurality of magnets respectively attached to the periphery of said core member between each two adjacent locating grooves to form said magnetic zones, and a hoop attached to an outer side of each said magnet to secure said magnets to the periphery of said core member, wherein said locating grooves are detachably mounted with one respective supplementary positioning strip, each said supplementary positioning strip comprising a positioning portion protruding over the periphery of said core member for securing said magnets to the periphery of said core member between each two adjacent locating grooves.

5. The electric motor rotor as claimed in claim 4, wherein said locating grooves are dovetail-shaped; each said supplementary positioning strip comprises a mounting portion mounted in one said locating groove in a complementary manner.

6. The electric motor rotor as claimed in claim 4, wherein the positioning portion of each said supplementary positioning strip is dovetail-shaped, having a width gradually increasing in direction away from the associating mounting portion.

7. The electric motor rotor as claimed in claim 4, wherein said magnets are sintered magnets.

\* \* \* \* \*